United States Patent
Hirata et al.

(10) Patent No.: US 9,857,669 B2
(45) Date of Patent: Jan. 2, 2018

(54) PROJECTION TYPE IMAGE DISPLAY DEVICE WITH SYMMETRICALLY ARRANGED LIGHT SOURCE AND POWER SUPPLY

(71) Applicant: Hitachi Maxell, Ltd., Ibaraki-shi, Osaka (JP)

(72) Inventors: Koji Hirata, Ibaraki (JP); Takafumi Ishizu, Tokyo (JP); Takatsugu Kawabata, Ibaraki (JP)

(73) Assignee: HITACHI MAXELL, LTD., Osaka (JP)

(*) Notice: Subject to any disclaimer, the term of this patent is extended or adjusted under 35 U.S.C. 154(b) by 31 days.

(21) Appl. No.: 14/392,198

(22) PCT Filed: Jun. 28, 2013

(86) PCT No.: PCT/JP2013/067932
§ 371 (c)(1),
(2) Date: Dec. 23, 2015

(87) PCT Pub. No.: WO2014/207935
PCT Pub. Date: Dec. 31, 2014

(65) Prior Publication Data
US 2016/0161834 A1    Jun. 9, 2016

(51) Int. Cl.
*G03B 21/14* (2006.01)
*G03B 21/16* (2006.01)
(Continued)

(52) U.S. Cl.
CPC ............ *G03B 21/145* (2013.01); *G03B 21/16* (2013.01); *G03B 21/206* (2013.01);
(Continued)

(58) Field of Classification Search
CPC .. G03B 21/145; G03B 21/16; G03B 21/2033; G03B 21/206; G03B 21/28; G03B 21/10
See application file for complete search history.

(56) References Cited

U.S. PATENT DOCUMENTS

2004/0160763 A1    8/2004 Saito
2007/0291236 A1    12/2007 Hirata et al.
(Continued)

FOREIGN PATENT DOCUMENTS

| JP | 2003-057754 A | 2/2003 |
| JP | 2004-252049 A | 9/2004 |

(Continued)

OTHER PUBLICATIONS

International Search Report of PCT/JP2013/067932.

*Primary Examiner* — Sultan Chowdhury
*Assistant Examiner* — Magda Cruz
(74) *Attorney, Agent, or Firm* — Mattingly & Malur, PC (57) ABSTRACT

A projection type image display device to be used with a mobile terminal has a housing with an upper side case having a reflective mirror attached thereto and an openable mirror cover formed thereon and a lower side case having a plurality of air exhausting openings provided on a side wall surface thereof. A light source is provided for shining image light that has been magnified and projected onto the reflective mirror; and an image is magnified and projected on the basis of the light from the light source. An optical system is disposed within the lower side case parallel to the bottom surface of the case along a central axis of the device, and also an image processing unit, which includes the light source, and a power supply unit are disposed within the lower case symmetrically with the optical system as the center.

11 Claims, 12 Drawing Sheets

(51) Int. Cl.
     *G03B 21/20*     (2006.01)
     *G03B 21/28*     (2006.01)
     *G03B 21/10*     (2006.01)

(52) U.S. Cl.
     CPC ......... *G03B 21/2033* (2013.01); *G03B 21/28* (2013.01); *G03B 21/10* (2013.01)

(56) References Cited

U.S. PATENT DOCUMENTS

| | | |
|---|---|---|
| 2008/0204673 A1 | 8/2008 | Hirata et al. |
| 2009/0122274 A1* | 5/2009 | Saito .................... H04N 9/3141 353/85 |
| 2011/0075115 A1 | 3/2011 | Ono et al. |
| 2012/0081676 A1 | 4/2012 | Hirata et al. |
| 2012/0133907 A1 | 5/2012 | Otani et al. |

FOREIGN PATENT DOCUMENTS

| | | | |
|---|---|---|---|
| JP | 2005-107218 A | 4/2005 | |
| JP | 2009-031557 A | 2/2009 | |
| JP | 2009-042371 A | 2/2009 | |
| JP | 2011-070087 A | 4/2011 | |
| JP | 2012-008179 A | 1/2012 | |
| JP | 2012-098713 A | 5/2012 | |
| JP | 2013-123099 A | 6/2012 | |
| JP | 2012-185387 A | 9/2012 | |
| JP | 2012-215909 A | 11/2012 | |
| JP | 2013-008044 A | 1/2013 | |
| JP | WO 2015037138 A1 * | 3/2015 | ........... G03B 21/145 |

* cited by examiner

SPREADING RANGE OF LOWER LIMIT LIGHT OF IMAGE LIGHT

FIG.6

SPREADING RANGE OF IMAGE LIGHT

PROJECTION TYPE IMAGE DISPLAY DEVICE WITH SYMMETRICALLY ARRANGED LIGHT SOURCE AND POWER SUPPLY

TECHNICAL FIELD

The present invention relates to a projection type image display device.

BACKGROUND ART

Projection type image display devices are applied to large-scaled projection televisions and widely being used as a device that receives an image signal from the outside, enlarges the image, and projects the image onto a panel, a wall surface, or the like as disclosed in Patent Document 1. In recent years, the projection type image display devices are also expected as a device capable of easily projecting, for example, an image obtained by a mobile terminal such as an iPhone or an iPad mini onto a wall surface, a surface of a desk, or the like in addition to display of an image signal from a personal computer (PC). A projection lens system including a reflective mirror (a free-form surface mirror) or a free-form surface lens for this is disclosed in detail in Patent Document 2.

CITATION LIST

Patent Document

Patent Document 1: JP 2013-8044 A
Patent Document 2: JP 2012-215909 A

SUMMARY OF THE INVENTION

Problems to be Solved by the Invention

However, in the projection type image display device, particularly, in the large-scaled projection television, a distance to a projection plane onto which an image from a projection device is projected has to be set to be relatively large, the weight thereof is large, and a projector that is connected to a PC and projects an image is installed in view of an external dimension and a weight of the PC. For this reason, a practical projection type image display device that can be used, particularly, together with a mobile terminal in view, of an external dimension and a weight has not been proposed yet.

In this regard, the present invention was made in light of the problems of the related art described above, and it is an object of the present invention to provide a projection type image display device having a configuration suitable for use, particularly, together with a mobile terminal in view of an external dimension and a weight.

Solutions to Problems

In order to achieve the above object, according to the present invention, first, provided is a projection type image display device which includes a housing having a shape that is erectable using one side as a bottom surface, the housing including a lower case and an upper case, the upper case including a reflective mirror attached thereto and an openable mirror cover formed thereon, the lower case including a plurality of air exhaust ports formed in a sidewall surface thereof, a light source that irradiates the reflective mirror with image light to be enlarged and projected, an image processing unit that processes an image to be enlarged and projected based on the light from the light source and an electric signal from the outside, and a power supply unit that supplies electric power to the light source and the control unit, wherein the optical system is arranged in the lower case along a central axis of the device in parallel to a bottom surface of the case, and the image processing unit including the light source and the power supply unit are arranged at symmetric positions centering on the optical system in the lower case.

Effects of the Invention

According to the present invention, it is possible to provide a projection type image display device having a configuration that is suitable for use, particularly, together with a mobile terminal in view of an external dimension and a weight and excellent in practical use.

MODE FOR CARRYING OUT THE INVENTION

Hereinafter, a projection type image display device according to an embodiment of the present invention will be described in detail with reference to the drawings.

Figure 1:
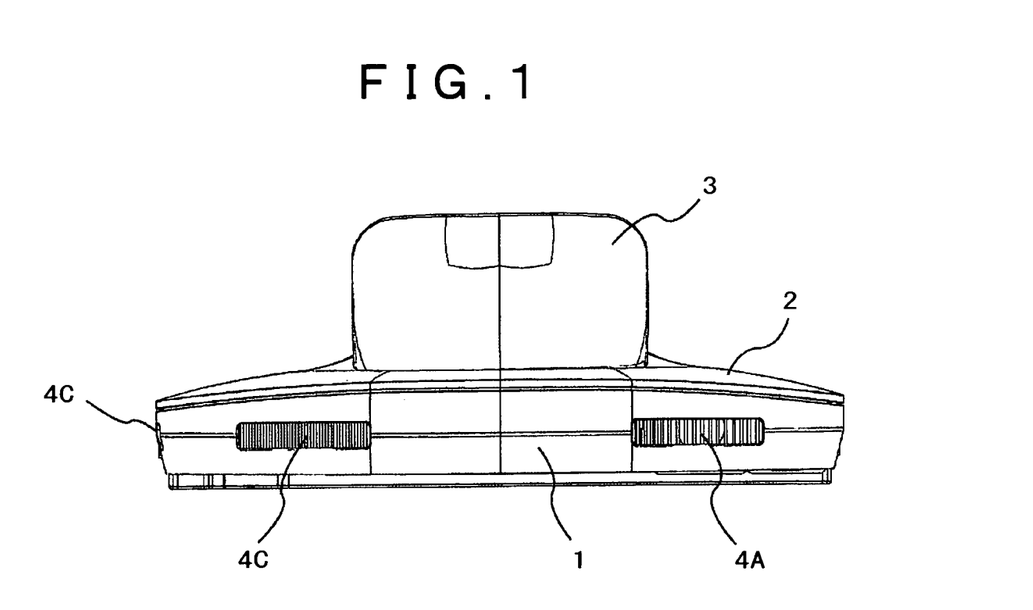
FIG. 1 is a diagram illustrating an external appearance (front) of a projection type image display device.

First, FIG. 1 is a front view illustrating an external appearance of a projection type image display device, and a reference numeral 1 indicates a lower case of the device, 2 indicates an upper case, 3 indicates an openable mirror cover formed on the top surface of the upper case, and 4 indicates an exhaust port that is formed on the side of the lower case and discharges heat generated in the device to the outside (technically, a sirocco fan and an axial flow fan are installed in the device, and an exhaust port of air from the sirocco fan is indicated by adding "C" after the reference numeral, and an exhaust port of air from the axial flow fan indicated by adding "A" after the reference numeral). A housing of the device having a substantially flat box-like external shape is formed by the lower case 1 and the upper case 2. Thus, it is possible to make the device erect using a back surface side as a bottom surface while considering a case in which the device is used in a state in which it stands on a surface of a desk or a table (when an image is projected onto the surface of the desk or the table) as a use state of the device as well. Further, a mechanism such as a stand that can be attachable to the housing or can be installed in the housing and taken out may be installed.

The present inventors have conducted various of reviews for reducing the size of the projection type image display device and have found that it is important to arrange, particularly, a part associated with heat generation and a cooling structure thereof, that is, it is important to arrange the part and the cooling structure thereof so that they do not have adverse affects on an optical system. Hereinafter, the projection type image display device will be described in detail based on such findings.

Optical System

Figure 2:
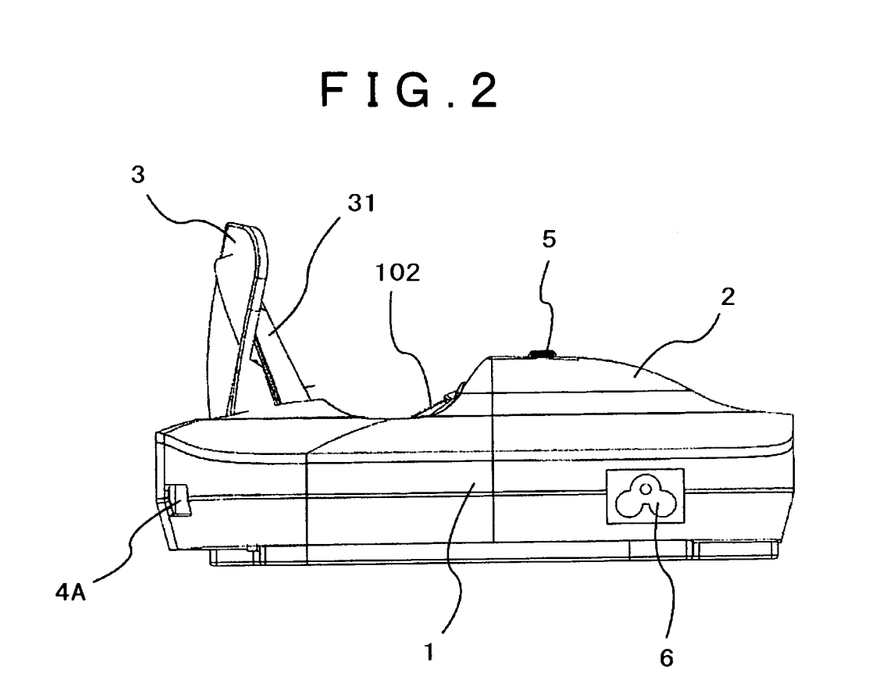
FIG. 2 is a diagram illustrating an external appearance (right side) of a projection type image display device.

FIG. 2 is a side view illustrating the projection type image display device. A reflective mirror (free-form surface mirror) 31 that is formed in a convex shape to be rotationally asymmetric is attached to the inside of the mirror cover 3 that is openably attached to the top surface of the upper case, a lens optical system 102 which will be described later is arranged in a convex portion formed in substantially the center of the front surface of the upper case (see FIG. 1), and an opening for guiding projection light to the outside is formed in the convex portion (only a portion of the lens optical system 102 is illustrated through the opening in FIG. 2). In FIG. 2, a reference numeral 5 indicates a portion (an upper end portion protruding from the upper case to the outside) of a so-called focus adjustment ring for adjusting a focus state of a projection image by changing a lens position by a lens adjustment mechanism. In FIG. 2, a reference numeral indicates a so-called power inlet for supplying electric power (commercial electric power) necessary for a light source, a control device, and the like, and the power inlet 6 is installed in the side of the lower case 1 (the side at which the power supply unit is installed).

Figure 3:
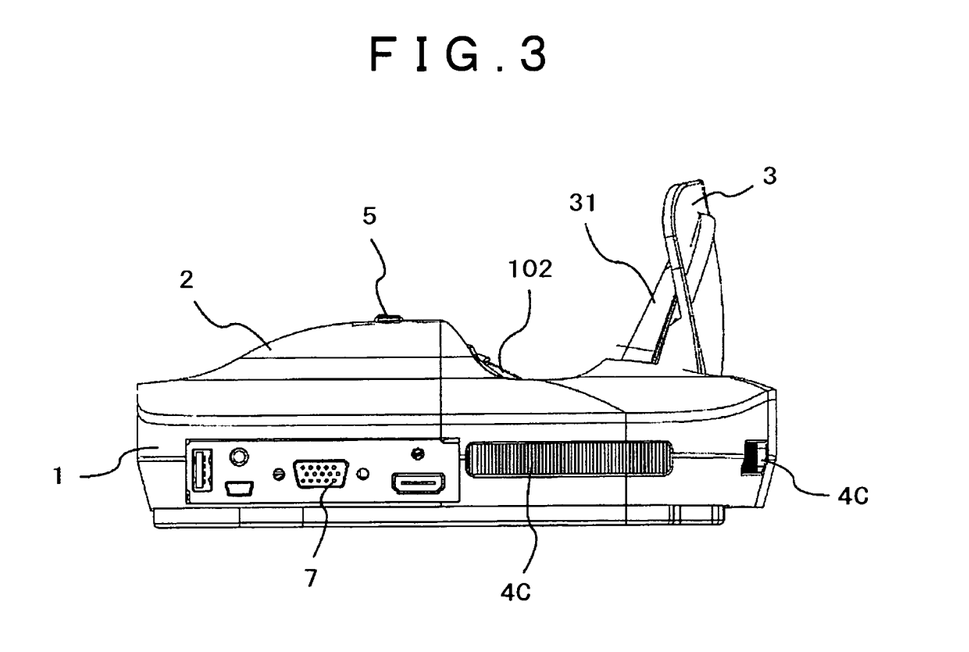
FIG. 3 is a diagram illustrating an external appearance (left side) of a projection type image display device.

FIG. 3 is a side view illustrating a side of the projection type image display device that is opposite to FIG. 2, and the exhaust port 4 and a terminal board 7 equipped with various kinds of terminals for receiving an image signal from an external device (for example, a mobile terminal, a PC, or the like) are installed on a side (a side on which an LED illumination unit is installed) of the lower case 1. The exhaust port 4 illustrated at substantially the center of FIG. 3 is an exhaust port for discharging air from the sirocco fan for cooling down a control unit (configured with a CPU, for example) for controlling an operation of an electric circuit mounted in the device, particularly, an image processing device or an LED driving substrate or an operation of the entire device including the image processing device and the LED driving substrate.

Figure 14:
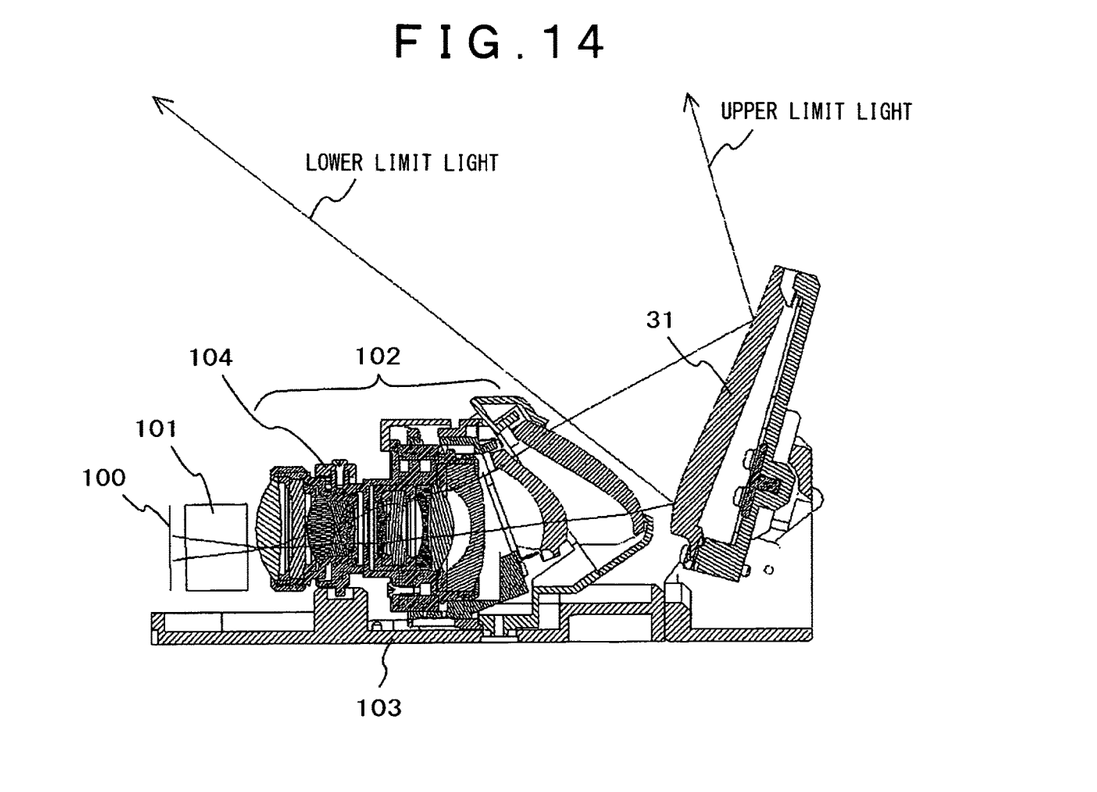
FIG. 14 is a partially enlarged cross-sectional view illustrating an example of an optical system in a projection type image display device.

FIG. 14 is a cross-sectional view illustrating an example of a configuration of the optical system. For example, light emitted from a light source including a semiconductor laser is modulated by a reflective optical modulation device 100 including a micro mirror or a reflective liquid crystal panel (Liquid crystal on silicon (LCOS) (a registered trademark) or a transmissive optical modulation device 100 including a liquid crystal panel or the like such as a digital light processing (DLP) (a registered trademark) device 100 according to an external image signal (for example, an image signal from a mobile terminal), and an image obtained as a result is synthesized through a TIP prism 101, projected onto a reflective mirror 31 through a projection lens system 102 including a plurality of lenses, reflected by the surface of the reflective mirror 31, and enlarged and projected. The projection lens system 102 including the plurality of lenses is configured with various kinds of lenses including a free-form surface lens that is not rotationally symmetric and is necessary for correcting various kinds of distortion associated with enlargement and projection of an image such as distortion caused by oblique incidence or trapezoidal distortion, for example. Further, the projection lens system 102 is movably mounted on a projection lens base 103, and it is possible to adjust focus performance by moving some projection lens or a group of lenses vertically in FIG. 14 through an operation of a lens adjustment mechanism 104 in FIG. 14.

In FIG. 14, upper limit light LU and lower limit light LD of image light that is enlarged and projected onto the reflective mirror 31 through the optical system (see a broken line in FIG. 14), then reflected by the surface of the reflective mirror 31, and projected, for example, on a screen, a wall surface, or the surface of a desk, a table, or the like is indicated by an arrow.

In the present invention, in view of a case in which the projection type image display device is used with a mobile terminal, for example, external dimensions are set such that a length is set to 192 mm, a width is set to 265 mm, and a minimum height is set to 26 mm, and a weight is set to 1100 g. According to the external dimensions and the weight, a user can insert the projection type image display device into a pocket or a bag and carry it with a mobile terminal.

Further, in the present invention, by employing the optical system configured with the reflective mirror 31 and the projection lens system 102 including the free-form surface lens, the above-described requirements or restrictions for the projection type image display device are satisfied, and particularly, projection performance capable of displaying a sufficient image although a distance from the device to the image projection plane is small is secured. For example, in the projection type image display device, when an image is projected in a state in which the leading end comes into contact with the plane onto which an image is projected, that is, in a non-arrangement state, a 30.5"×17.2" screen (a screen size 16:9 of diagonal 35 inches) can be obtained.

In the present invention, in order to reduce the height of the device as small as possible, the optical system including the reflective mirror 31 and the projection lens system 102 is arranged on a plane (specifically, on the projection lens base 103 arranged on the bottom of the lower case 1) to be parallel to the surface thereof (for example, 1.5 degree or less). In other words, in order to obtain a large projection image at a predetermined projection distance, for example, the projection lens system 102 is considered to be arranged in a state oblique to the bottom surface (a state oblique other than perpendicular to a screen) to increase a diffusion, angle (for example, an angle formed by the upper limit light LU and the lower limit light LD in FIG. 14) of image light in the reflective mirror 31, but in this case, the oblique arrangement of the projection lens system 102 increases the height of the device and is disadvantageous in obtaining a small light-weighted projection type image display device related to the present invention.

Figure 4:
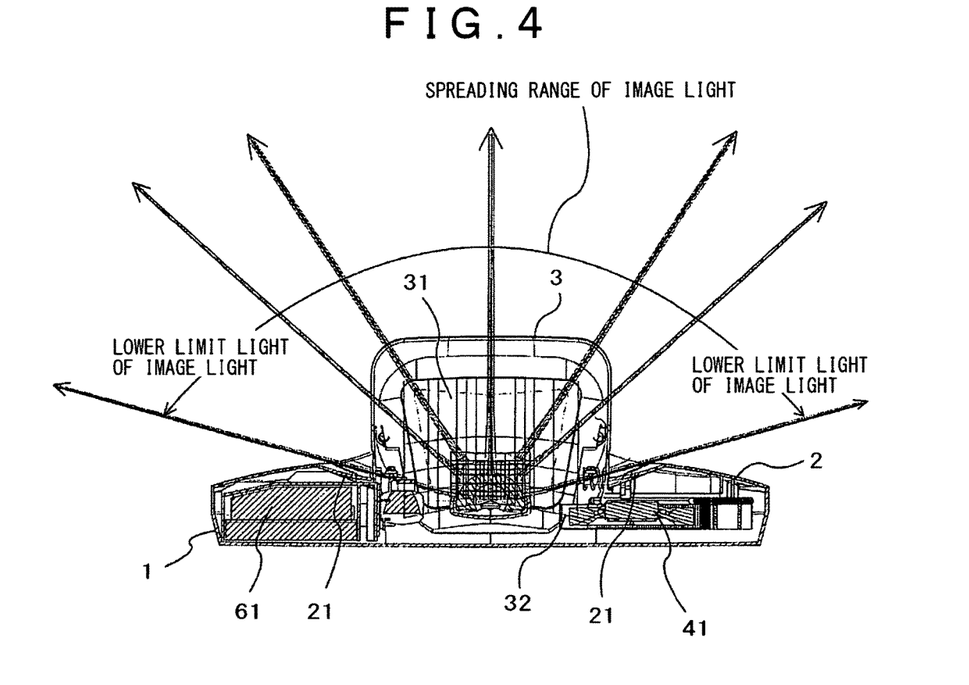
FIG. 4 is a perspective view illustrating a projection type image display device and an internal configuration thereof.
Figure 5:
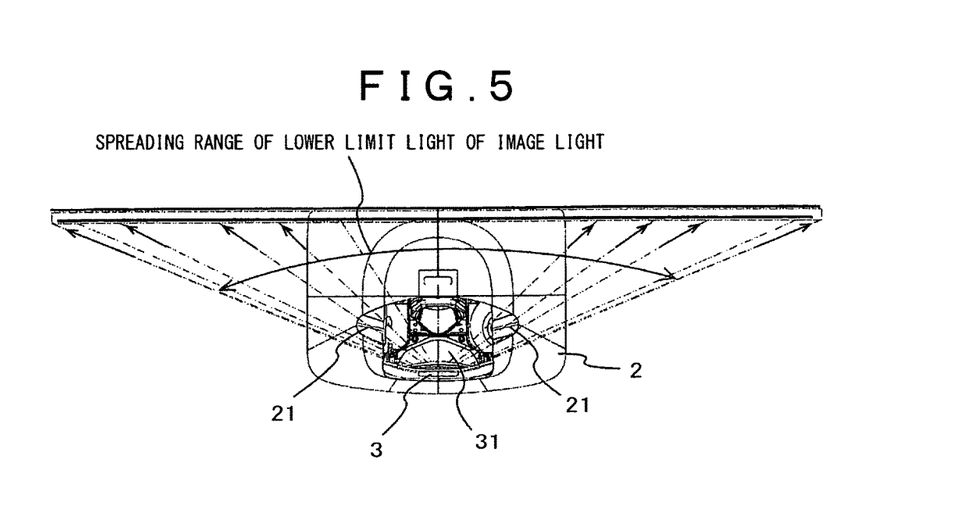
FIG. 5 is an external appearance diagram illustrating a projection type image display device and spreading of image light thereby.
Figure 6:
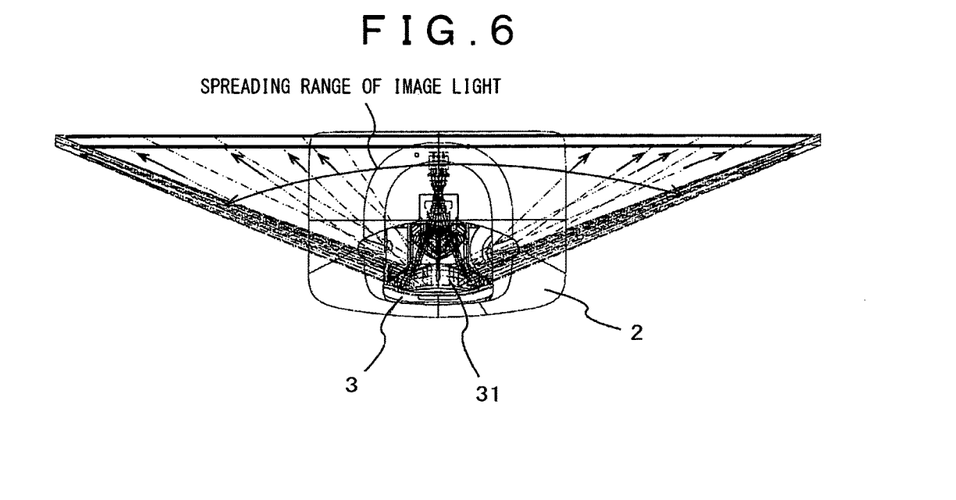
FIG. 6 is an external appearance diagram illustrating a projection type image display device and spreading of image light thereby.
Figure 11:
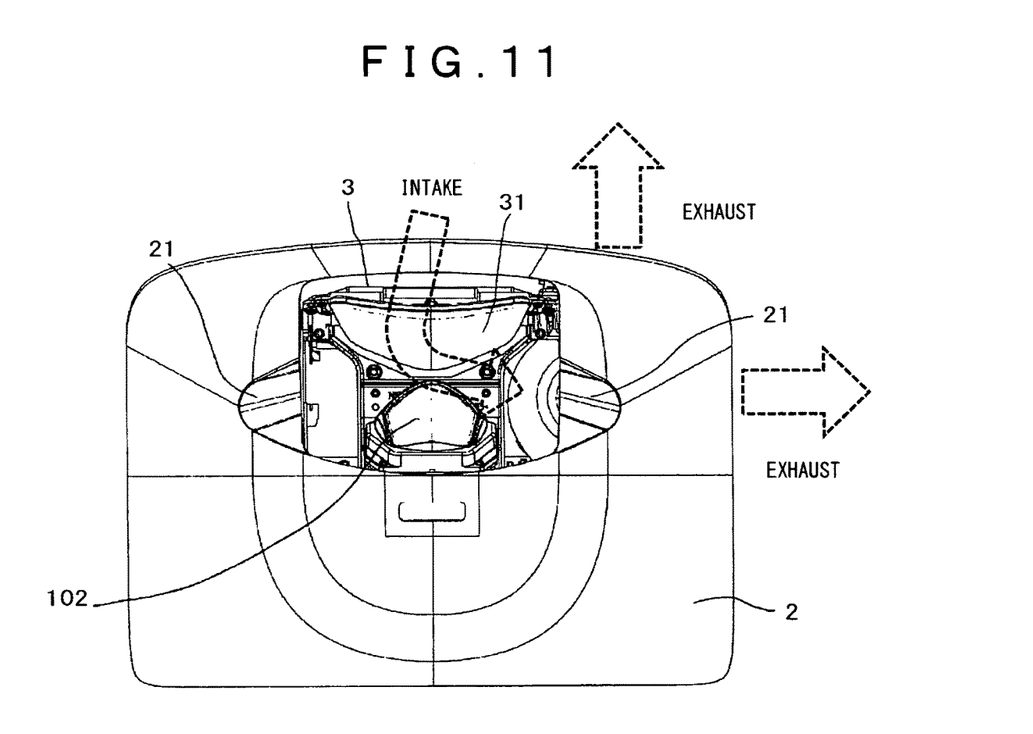
FIG. 11 is a top view illustrating an external appearance of a projection type image display device.
Figure 12:
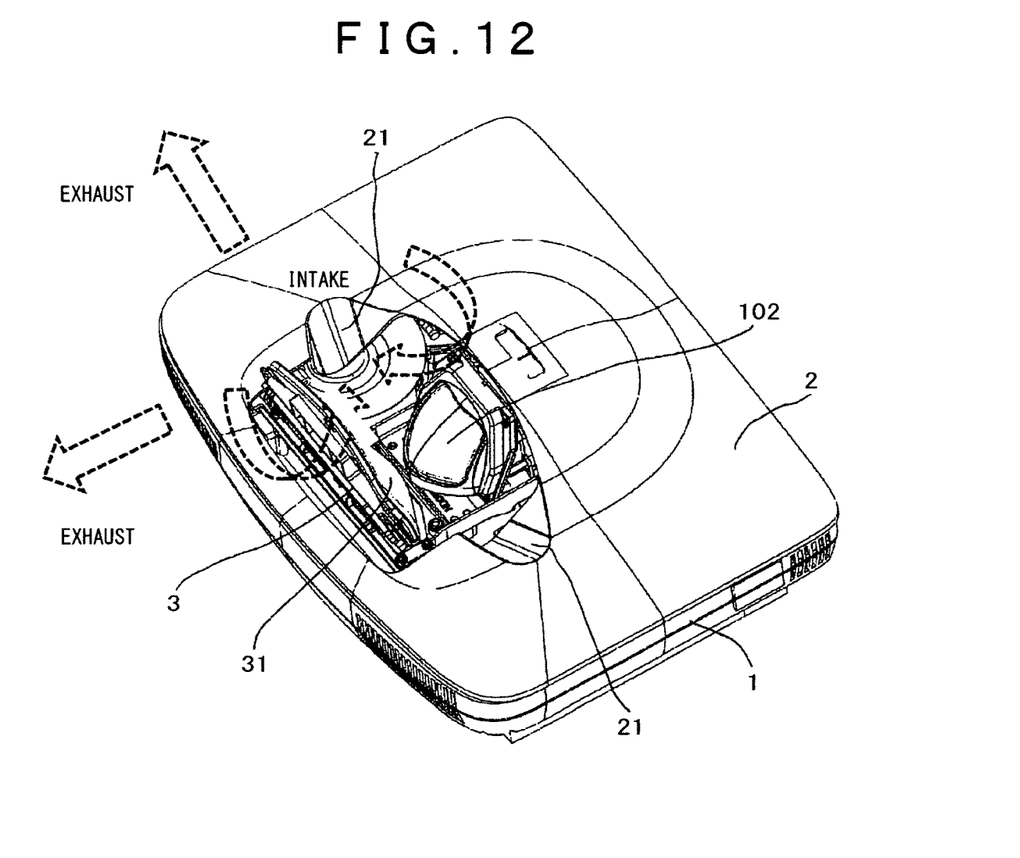
FIG. 12 is a perspective view illustrating an external appearance of a projection type image display device.

In the present invention, in order to sufficiently secure horizontal spreading of image light that is reflected by the reflective mirror 31 and projected, as illustrated in FIGS. 4 to 8 and FIGS. 11 and 12, so-called notched portions 21 are formed in a portion of the convex portion of the upper case 2, that is, on both sides of the opening formed in a portion of the upper case 2 so that light reflected from the reflective mirror 31, particularly, the lower limit light LD at both sides toward which image light spreads is not blocked. In FIG. 4, a reference numeral 41 indicates the sirocco fan for cooling down the control unit. In FIG. 4, a reference numeral 32 indicates a mirror fixing hinge for fixing the reflective mirror 31 to a predetermined angular position, a power supply unit 61 that receives electric power necessary for an operation of the projection type image display device from an alternating current (AC) power source through the power inlet 6, changes the received electric power to necessary direct current (DC) or AC power, and supplies the DC or AC power to the respective units is arranged at a side of the lower case 1 opposite to the sirocco fan 41, and an axial flow fan 42 is arranged below the power supply unit 61. In FIGS. 11 and 12, as will be described in detail below, "intake" and "exhaust" are indicated by broken lines in order to illustrate the flow of air that is taken in from the outside and discharged to the outside to cool down the respective units of the device.

Internal Structure

Next, an internal structure of the projection type image display device will be described in detail below with reference to FIGS. 7 to 10.

Figure 7:
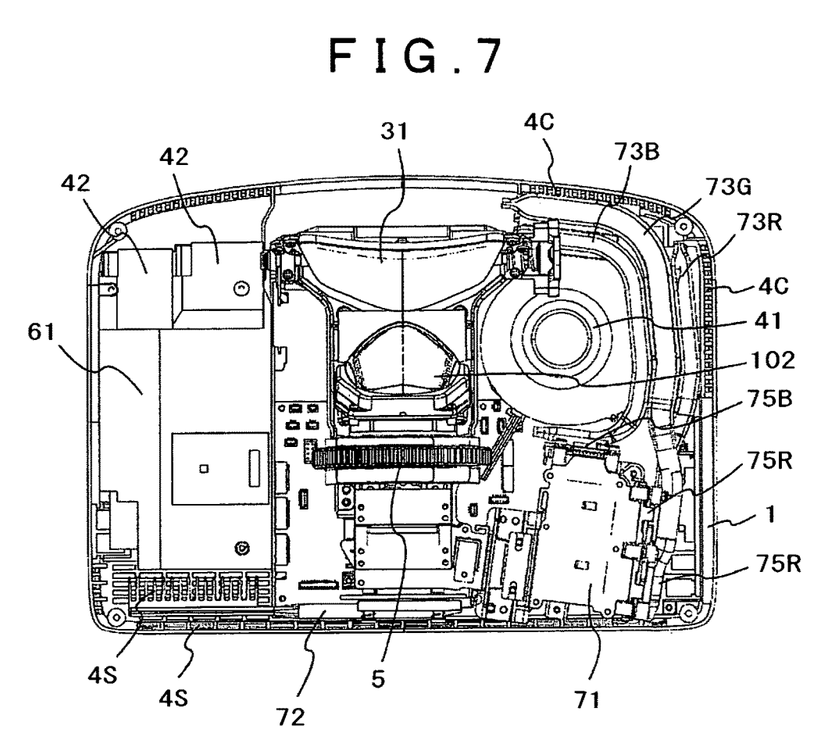
FIG. 7 is a top view illustrating a detailed internal structure of a housing of a projection type image display device in a state in which an upper case is removed.
Figure 8:
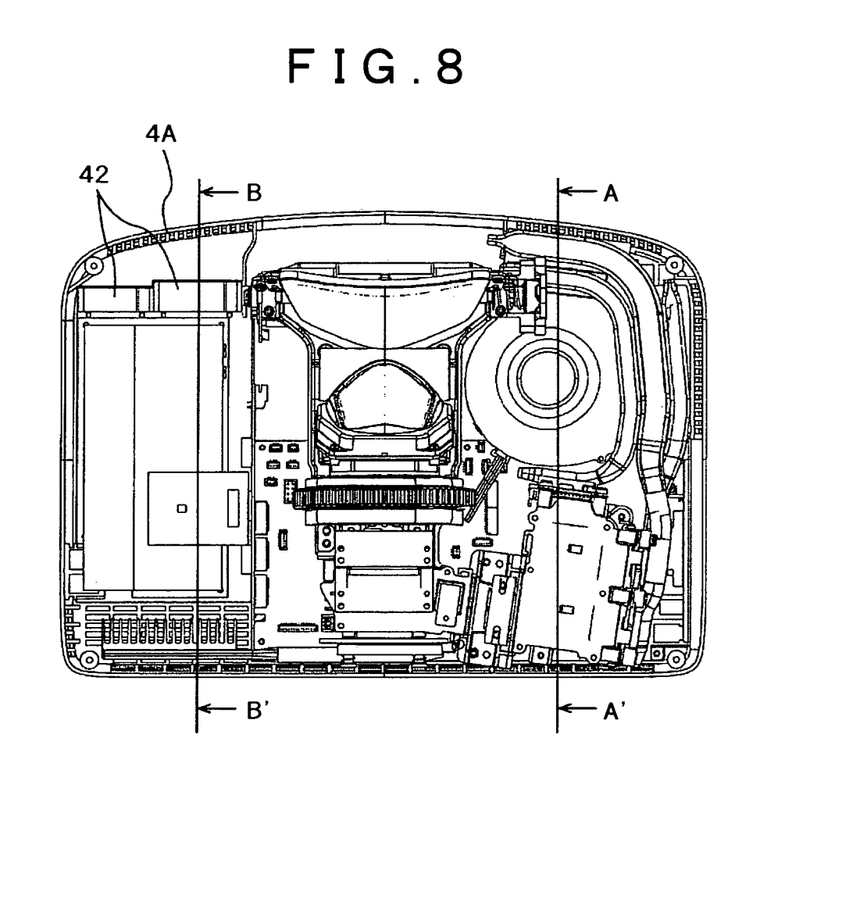
FIG. 8 is a top view illustrating a detailed internal structure of a housing of a projection type image display device in a state in which an upper case is removed.

FIGS. 7 and 8 are top views illustrating an internal structure of the projection type image display device in a state in which the upper case 2 is removed. In FIGS. 7 and 8, the optical system including the reflective mirror 31 and the projection lens system 102 is arranged at the center of the device along a central axis (a central axis vertical to a plane of paper) which passes through the center of the lower case 1, that is, the center of the external appearance of the device in the top view and along which a central component of projection light travels. Further, the power supply unit 61 is arranged on one side (the left in FIGS. 7 and 8) centering on the projection lens system 102, and a plurality of axial flow fans 42 (two axis flow fans 42 in this example) are arranged on one end side of the power supply unit 61 to be adjacent to each other. The sirocco fan 41 is arranged on the other side (the right in FIGS. 7 and 8) centering on the projection lens system 102.

A portion of a housing of the sirocco fan 41 is formed integrally with a heat dissipation fin, heat generated in an LED 75G that emits green (G) light in an LED illumination unit 71, heat generated in an LED 75R that emits red (R) light, and heat generated in an LED 75B that emits blue (B) light are transferred to the heat dissipation fin via a heat pipe 73G, a heat pipe 73R, and a heat pipe 73B, respectively, cooled down by cooling air generated by the sirocco fan 41, and discharged through the exhaust port 4C.

For example, the LED illumination unit 71 that configures the light source is arranged along the aerial flow generated by the sirocco fan 41. In other words, such components are arranged to be bilaterally symmetric centering on the projection lens system 102. In FIG. 7, a reference numeral 72 indicates a heat sink for cooling the DLP device, and a reference numeral 4S indicates intake ports formed on the bottom surface and the side surface of the lower case 1.

In FIG. 7, the three heat pipes 73 are illustrated, and each of the heat pipes 73 can perform efficient heat dissipation by transferring heat of the LED illumination unit 71 to the vicinity of the exhaust port. More specifically, the LED 75G that emits green (G) light in an LED illumination unit 71, the LED 75R that emits red (R) light, and the LED 75B that emits blue (B) light are transferred to the vicinity of the exhaust port 4C via the heat pipe 73G, the heat pipe 73R, and the heat pipe 73B, respectively, dissipated by cooling air generated by the sirocco fan 41 through the heat dissipation fin, and discharged from the exhaust port 4C to the outside of the housing.

Figure 9:
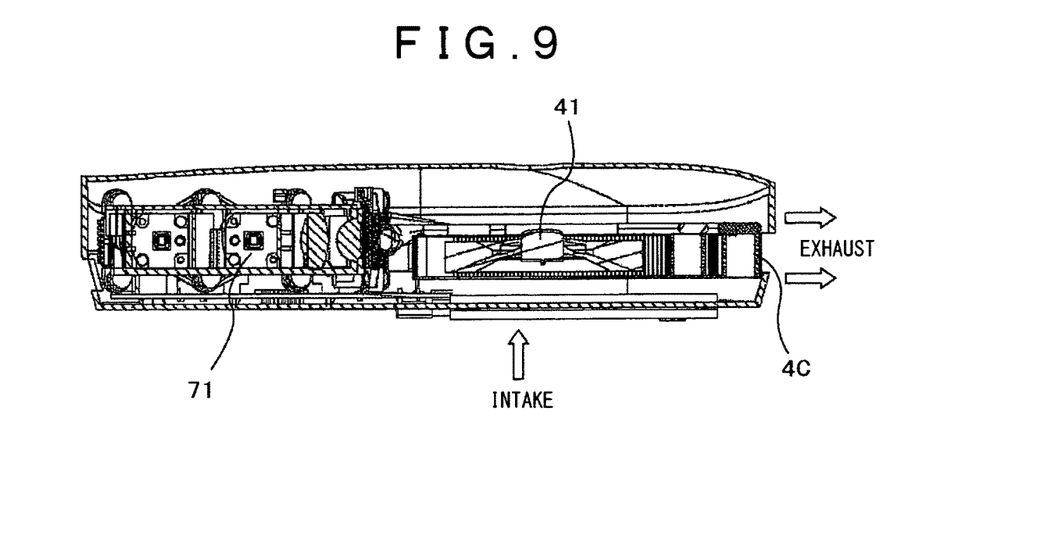
FIG. 9 is a cross-sectional view taken along line A-A' of FIG. 8 for illustrating a cooling structure in a housing of a projection type image display device.
Figure 10:
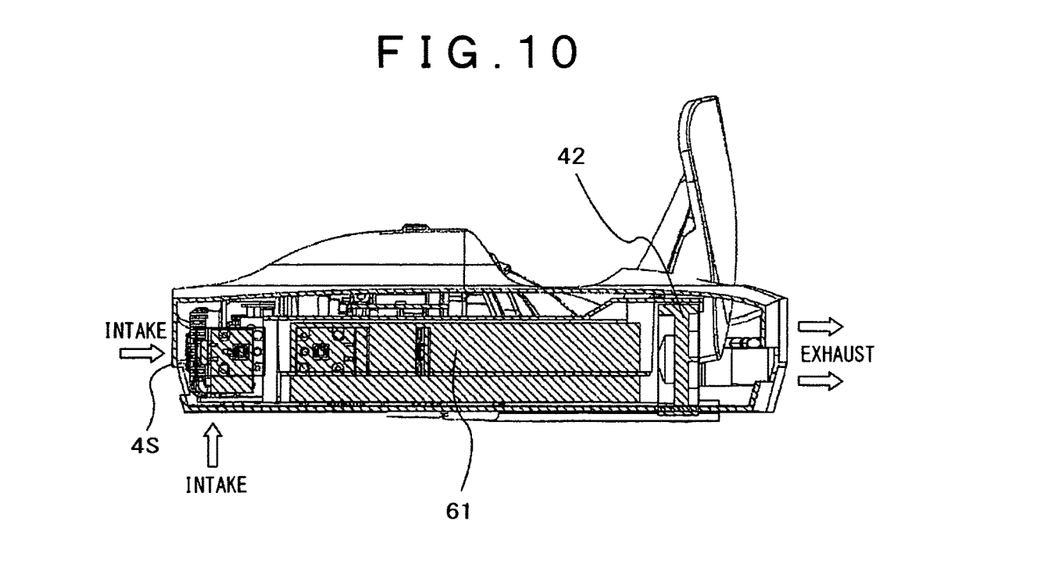
FIG. 10 is a cross-sectional view taken along line B-B' of FIG. 8 for illustrating a cooling structure in a housing of a projection type image display device.

The cooling structure will be described in detail with reference to FIGS. 9 to 13. FIG. 9 is a cross-sectional view taken along line A-A' in a state in which the mirror cover 3 is closed in the projection type image display device illustrated in FIG. 8, and FIG. 10 is a cross-sectional view taken along line B-B' in a state in which the mirror cover 3 is opened in the projection type image display device illustrated in FIG. 8.

First, FIG. 9 illustrates the cooling structure of the LED illumination unit 71, and the sirocco fan 41 attached to the inside of the cooling structure takes air in from the outside through the intake port (not illustrated) formed on the bottom surface of the lower case 1, and air from the sirocco fan installed on the front of the device (the right in FIG. 9) is discharged through the exhaust port 4C.

Figure 13:
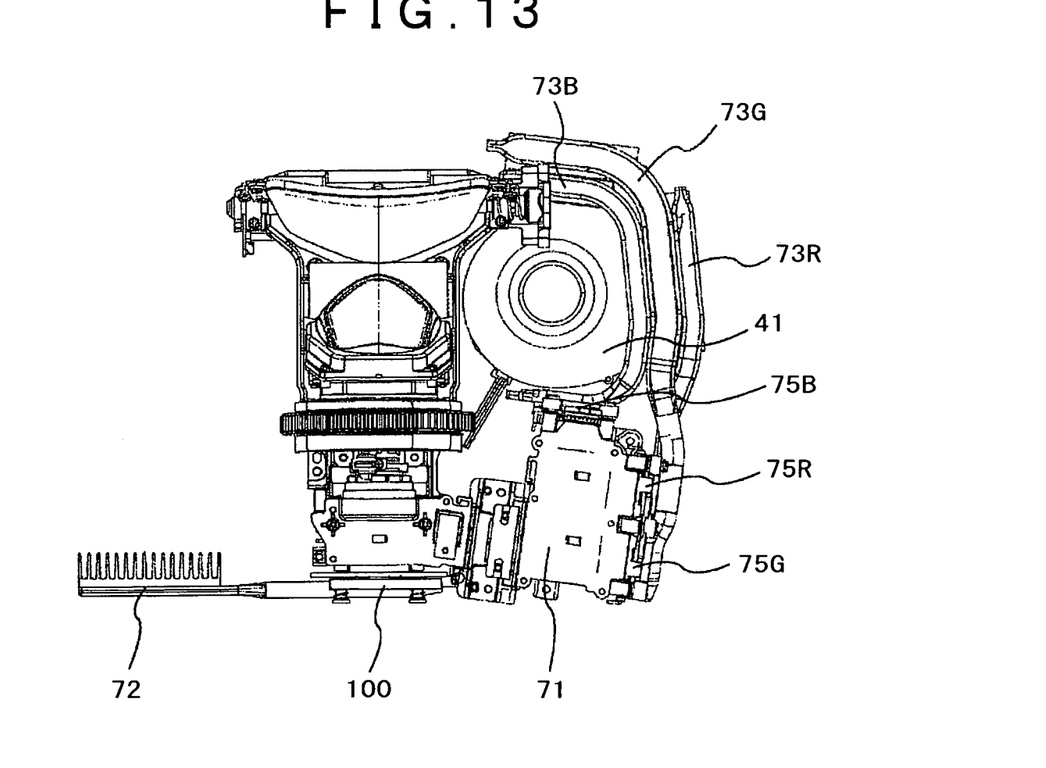
FIG. 13 is a partially enlarged view for describing a cooling structure of an LED illumination unit in a projection type image display device.

At this time, as also illustrated in FIGS. 7, 8, and 13, heat from the three LEDs (semiconductor lasers) 75R, 75G, and 75B serving as a heat generation source in the LED illumination unit 71 is transferred to the vicinity of the exhaust ports 4C (see FIG. 7) formed on the front and the side of the lower case 1 through the heat pipes 73R, 73G, and 73B. Specifically, one end of the heat pipe 73 is attached to the surface of the LED for heat conduction, and the other end thereof is arranged in the vicinity of the exhaust port. In this regard, as heat is transferred to air taken in from the outside (as heat exchange occurs), the three LEDs 75R, 75G, and 75B are efficiently cooled down.

In other words, the cooling structure is suitable for cooling a part in which heat is locally generated in a portion thereof (that is, the three LEDs 75R, 75G, and 75B) as in the LED illumination unit 71 particularly. In further detail, since calorific values of the three LEDs 75R, 75G, and 75B are different, the heat pipes 73R, 73G, and 73B used for the three, LEDs 75R, 75G, and 75B are arranged to be different in a number thereof (a heat exchange amount) at a position at which it is arranged in the vicinity of the exhaust port 4C. The number of heat pipes 73 to be arranged is appropriately set according to the magnitude of the calorific value from the LED, and thus a more efficient heat dissipation effect can be achieved.

For example, since the calorific value from the LED 75G that emits the G light is largest, the heat pipe 73G is arranged to be adjacent to the exhaust ports 4C at two positions and positioned at the upstream side in the aerial flow. The heat pipe 73B for cooling down the LED 75B that emits the B light and is second largest in the calorific value is also arranged to be adjacent to the exhaust ports 4C at two positions, similarly to the heat pipe 73G but positioned at the downstream side in the aerial flow. Further, the heat pipe 73R for cooling down the LED 75R that emits the R light and is relatively small in the calorific value is arranged to be adjacent to only the exhaust port 4C formed on the side of the lower case 1 and positioned at the most downstream side in the aerial flow. In addition, since the calorific value from the heat pipe 73G for the LED 75G that emits the G light is larger than the calorific value from the LED 75R that emits the R light, the heat pipe 73G is arranged at the more upstream side (that is, at the position close to the sirocco fan).

In other words, according to the cooling structure, it is possible to efficiently dissipate heat locally generated in a part to the outside of the device. Further, in order to reduce the height of the device as small as possible, it is desirable to use a so-called thin sirocco fan whose thickness is smaller than the thickness of the LED illumination unit 71 serving as a target to be cooled. Particularly, the sirocco fan 41 can obtain a large air volume by setting a ratio of the height and the diameter to 10:1 or more, and when the ratio of the height and the diameter is set to 15:1, further improvement (an increase in an air volume) can be made.

FIG. 10 illustrates a cooling structure for the power supply unit 61 serving as another main heat generation source. In other words, the power supply unit 61 is arranged in the lower case 1, but the axial flow fan 42 is arranged at a position (the back surface side of the device, that is, the left in FIG. 10 in this example) adjacent to the unit. According to this cooling structure, air is taken from the outside through the intake port 4S formed in back surface (the left surface in FIG. 10) of the lower case 1 and an intake port (not illustrated) formed on the bottom surface, then flows around the power supply unit 61 to conduct heat away from the power supply unit 61, and is then discharged to the outside of the device through the exhaust port 4C.

Since the entire power supply unit 61 generates heat unlike the LED illumination unit 71, the cooling structure is employed. Further, when the projection type image display device is used, for example, in a state in which it stands on the surface of the desk or the table (when an image is projected onto the surface of the desk or the table), the intake port (not illustrated) formed on the bottom surface is formed to secure sufficient intake of external air regardless of a change in the use state in view of a case in which the intake port 4S formed on the back surface (the left surface in FIG. 10) of the lower case 1 is closed.

In the present invention, in order to implement the small-scaled projection type image display device having the excellent projection performance, the optical system equipped with the reflective mirror (the free-form surface mirror) and the projection lens system is employed, the optical system is arranged along the central axis passing through the center thereof in the housing configured with the lower case 1 and the upper case 2, the LED illumination unit 71 and the power supply unit 61 are arranged to be bilaterally symmetric centering on the optical system, and the structure of independently cooling the LED illumination unit 71 and the power supply unit 61 as necessary is provided.

Each of an image processing unit including a light source and the power supply unit is equipped with an independent cooling unit, the cooling unit with which the image processing unit is equipped includes the sirocco fan having the thickness thinner than that of the image processing unit and the heat pipe, the image processing unit includes a plurality of light sources having different luminescent colors, and the heat pipes are preferably arranged at different positions with respect to the exhaust port in the lower case in association with the plurality of light sources having the different luminescent colors. Each of the plurality of different light sources is preferably configured with an LED. Further, the cooling unit with which the power supply unit is equipped may be an axial flow fan. It is desirable that the reflective mirror be a mirror having a surface that is convex toward the image side and a mirror having a free-form surface in a shape, and a group of lens configuring the optical system include a free-form surface lens, and it is desirable that the notched portion through which the lower limit light of the image light that is reflected, enlarged, and projected by the reflective mirror passes be formed in each of portions of the upper case at symmetric positions centering on the optical system.

According to the above-described configuration, a part associated with heat generation and a cooling structure thereof can have the structure suitable for the size reduction of the device without having adverse effects on the optical system.

REFERENCE SIGNS LIST 1 lower case
2 upper case
3 mirror cover
4A, 4C, 4S exhaust port
21 notched portion
31 reflective mirror (free-form surface mirror)
41 sirocco fan
42 axial flow fan
61 power supply unit
71 LED illumination unit
73R, 73G, 73B heat pipe
75R, 75G, 75B LED
100 DLP (digital light processing) device
102 lens optical system
LD lower limit light

The invention claimed is:

1. A projection type image display device, comprising:
a housing having a shape that is erectable using one side as a bottom surface, the housing including a lower case and an upper case, the upper case including an openable mirror cover on which a reflective mirror is attached, the lower case including a plurality of air exhaust ports formed in a sidewall surface thereof;
a light source that irradiates the reflective mirror with image light to be enlarged and projected;
an optical system that is configured with the reflective mirror and a plurality of lenses; and
a power supply unit that supplies electric power to the light source,
wherein the optical system is arranged in the lower case along a central axis of the lower case in parallel to a bottom surface of the housing, and
wherein the light source and the power supply unit are arranged at symmetric positions centering on the optical system in the lower case.

2. The projection type image display device according to claim 1,
wherein each of the light source and the power supply unit is equipped with an independent cooling unit.

3. The projection type image display device according to claim 2, further comprising:
one or more heat pipes attached to the light source,
wherein the cooling unit with which the light source is equipped includes a sirocco fan that is thinner in thickness than the light source and the heat pipes.

4. The projection type image display device according to claim 3, wherein a ratio of a height and a diameter of the sirocco fan is 10:1 or more.

5. The projection type image display device according to claim 3,
wherein the light source includes a plurality of light sources having different luminescent colors, and the heat pipes are arranged at different positions with the exhaust ports in the lower case according to the plurality of light sources having the different luminescent colors.

6. The projection type image display device according to claim 5,
wherein each of the different light sources is configured with a respective LED.

7. The projection type image display device according to claim 5,
wherein the heat pipes of the different light sources are arranged such that one of the heat pipes having a largest calorific value is arranged at an upstream side in an aerial flow formed by the sirocco fan.

8. The projection type image display device according to claim 6,
wherein the heat pipes vary according to the respective LED to which they are attached.

9. The projection type image display device according to claim 2,
wherein the cooling unit with which the power supply unit is equipped includes an axial flow fan.

10. The projection type image display device according to claim 1,
wherein the reflective mirror is a free-form surface mirror, and the plurality of lenses configuring the optical system includes a free-form surface lens.

11. The projection type image display device according to claim 1,
wherein a pair of notched portions through which lower limit light from the reflective mirror passes are arranged at symmetric positions centering on the optical system on the upper case.

* * * * *